US011371366B2

United States Patent
Brunhuber et al.

(10) Patent No.: US 11,371,366 B2
(45) Date of Patent: Jun. 28, 2022

(54) TURBINE BLADE HAVING AN OXIDATION-RESISTANCE BLADE AIRFOIL TIP

(71) Applicant: Siemens Energy Global GmbH & Co. KG, Munich (DE)

(72) Inventors: Christian Brunhuber, Auerbach (DE); Bernd Burbaum, Falkensee (DE); Roland Häbel, Bergisch Gladbach (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/982,610

(22) PCT Filed: Feb. 13, 2019

(86) PCT No.: PCT/EP2019/053531
§ 371 (c)(1),
(2) Date: Sep. 21, 2020

(87) PCT Pub. No.: WO2019/185231
PCT Pub. Date: Oct. 3, 2019

(65) Prior Publication Data
US 2021/0017866 A1    Jan. 21, 2021

(30) Foreign Application Priority Data
Mar. 28, 2018    (DE) ..................... 10 2018 204 724.3

(51) Int. Cl.
*F01D 5/28* (2006.01)
*B23K 26/342* (2014.01)
(Continued)

(52) U.S. Cl.
CPC ............ *F01D 5/282* (2013.01); *B23K 26/342* (2015.10); *B23P 9/00* (2013.01); *F01D 5/284* (2013.01);
(Continued)

(58) Field of Classification Search
CPC ........... F01D 5/282; F01D 5/284; F01D 5/288
See application file for complete search history.

(56) References Cited

U.S. PATENT DOCUMENTS

| 4,589,823 A | * | 5/1986 | Koffel ....................... F01D 5/20 416/241 B |
| 7,316,850 B2 | * | 1/2008 | Hu .......................... C22C 19/058 416/241 R |

(Continued)

FOREIGN PATENT DOCUMENTS

| EP | 1408197 A1 | 4/2004 |
| EP | 1743729 A2 | 1/2007 |

(Continued)

OTHER PUBLICATIONS

Brueckner Frank et al: "Enhanced manufacturing possibilities using multi-materials in laser metal deposition"; In: Laser Institute of America-LIA-: ICALEO 2017; 36th International Congress on Applications of Lasers & Electro-Optics; Oct. 22-26, 2017; Paper 1301, 9 S .-ISSN 978-1-940168-14-2; Paper #1301.

(Continued)

*Primary Examiner* — Michael L Sehn

(57) ABSTRACT

A turbine blade for the rotor of a gas turbine, having a blade airfoil, which has a blade airfoil main body with a first material and a blade airfoil tip with a second material, the second material being more resistant to oxidation than the first material. The composition of the second material is graduated at least in subregions. A method for producing the turbine blade includes: providing a main body of a turbine blade airfoil on a construction platform of a device for performing an additive method, the main body having a first material; applying a pulverous second material, which is different from the first material, in a certain amount; fusing the pulverous material by applying a high-energy beam; lowering the construction platform, repeating applying and fusing the pulverous material and of lowering the construction platform as many times as necessary to complete the tip of the blade airfoil.

12 Claims, 2 Drawing Sheets

(51) Int. Cl.
*B23P 9/00* (2006.01)
*B23K 101/00* (2006.01)

(52) U.S. Cl.
CPC ........ *F01D 5/288* (2013.01); *B23K 2101/001* (2018.08)

(56) References Cited

U.S. PATENT DOCUMENTS

| | | | |
|---|---|---|---|
| 8,647,073 B2* | 2/2014 | Hoebel | F01D 5/28 415/173.4 |
| 2011/0103967 A1 | 5/2011 | Hoebel et al. | |
| 2013/0294913 A1 | 11/2013 | Campbell et al. | |
| 2013/0302166 A1* | 11/2013 | Lee | F01D 11/14 416/95 |
| 2015/0034604 A1 | 2/2015 | Subramanian et al. | |
| 2016/0024941 A1 | 1/2016 | Kaiser | |
| 2016/0160661 A1 | 6/2016 | Balbach et al. | |

FOREIGN PATENT DOCUMENTS

| | | | |
|---|---|---|---|
| EP | 2317078 A2 | 5/2011 | |
| EP | 2845924 A1 | 3/2015 | |

OTHER PUBLICATIONS

PCT International Search Report and Written Opinion of International Searching Authority dated May 10, 2019 corresponding to PCT International Application No. PCT/EP2019/053531filed Feb. 13, 2019.

* cited by examiner

TURBINE BLADE HAVING AN OXIDATION-RESISTANCE BLADE AIRFOIL TIP

CROSS REFERENCE TO RELATED APPLICATIONS

This application is the US National Stage of International Application No. PCT/EP2019/053531 filed 13 Feb. 2019, and claims the benefit thereof. The International Application claims the benefit of German Application No. DE 10 2018 204 724.3 filed 28 Mar. 2018. All of the applications are incorporated by reference herein in their entirety.

FIELD OF INVENTION

The invention relates to a turbine blade, the blade section of which has a main body composed of a first material and a blade tip composed of a second, oxidation-resistant material, and to a method of producing said turbine bladec.

BACKGROUND OF INVENTION

Modern gas turbines, for example for gas and steam power plants, are the subject of constant improvement in order to enhance their efficiency. However, this leads to ever higher temperatures in the hot gas pathway. The metallic materials for blades, especially in the first stages, have been improved in the last few years with regard to their stability at high temperatures (creep resistance, thermomechanical fatigue). However, this led in some cases to a deterioration in the oxidation properties. This is becoming a problem particularly at the tip of a blade (blade section tip, blade tip), since there can be instances of stripping of the blade tip on the face of the blade tip (squealer tip) that faces the housing in operation—especially in the first hours of operation. There can be abrasion here of an MCrAlY layer deposited on the main material of the blade that conventionally comprises a nickel-based superalloy, as disclosed, for example, in document EP 2 317 078 A2, as a result of which the main material is then exposed to hot, oxidizing combustion gases. The oxidation of the material at the blade section tip results in higher gap losses and a shorter lifetime of the blade.

Attempts are conventionally made to at least limit this problem by a more conservative design of the gap, lowering of the combustion temperature or greater cooling of the blades/blade tips. However, these measures lead to a greater consumption of cooling air or loss of power. There are also efforts to minimize damage to the blade tip by means of a sufficiently thick and abradable ceramic layer on the ring segment. However, these ceramic layers tend to become brittle. The problem addressed is to improve on the prior art.

SUMMARY OF INVENTION

This object is achieved by a turbine blade having the features of the independent claims. Further advantageous embodiments and configurations of the invention are apparent from the further independent claims and dependent claims, the figures and the working examples. Said embodiments of the invention are advantageously combinable with one another.

A first aspect of the invention relates to a turbine blade for the rotor of a gas turbine, comprising a blade section which extends from the blade root in radial direction and includes a main body comprising a first material and a blade tip comprising a second material, wherein the second material is more resistant to oxidation than the first material.

The material of the blade tip has thus not simply been coated with oxidation-resistant material, but instead advantageously consists of an oxidation-resistant material. This can increase the durability of the of the blade tip to oxidative forces in the hot gas, including in the event of damage. More advantageously, the region of the squealer tip, the part of the blade tip directed toward the housing in radial direction, is formed from this material.

Advantageously, the second material of which the blade tip consists comprises an MCrAlY alloy. MCrAlY alloys (M represents Co and/or Ni) are advantageously notable for high oxidation resistance. Moreover, it is possible to apply an MCrAlY alloy directly to the first material. Additive manufacturing methods are particularly suitable for the construction of the blade tip, for example laser application welding, selective laser melting and selective electron beam melting.

The second material advantageously has the following chemical composition:
Co: 22-26% by wt.
Cr: 14-18% by wt.,
Al: 9.5-11.5% by wt.,
Y: 0.2-0.7% by wt.,
Re: 0.0-1.8% by wt.
Ta: 0.0-1.7% by wt.,
the remainder being nickel and coincidental and unavoidable impurities. This MCrAlY alloy in this composition is notable for particularly high thermal stability, which has an advantageous effect in relation to incision of the blade tip into an abradable coating of the corresponding turbine housing, and hence contributes to preventing gap losses. Formation of particular desired phases in the second material is at the discretion and within the ability of the person skilled in the art.

It is additionally advantageous when the first material used in the turbine blade of the invention is the alloy Alloy 247 (A247). The use of A247 is advantageous because the second material in the above-described composition forms an excellent bond to A247. A247 is a directionally solidified or columnar-crystallized material. However, first materials used may also be other alloys, where various crystal orientations may be present.

In an embodiment of the turbine blade of the invention, the composition of the second material is graduated at least in part-regions. In other words, the composition of the second material, at least in part-regions, changes gradually from the binding face to the first material toward the squealer tip. Part-regions are understood to mean sections of the second material, i.e., for example, a region that adjoins or else encompasses the transition between first and second material. For example, a graduated composition is advantageous if the metal bond between the first and second materials is insufficiently strong. In the region toward the first material, the second material is advantageously more similar to the first material in terms of its content of individual or all elements of the composition within the respective stated ranges. It is therefore particularly advantageous when the second material is graduated in the region of the transition from the first material to the second material in such a way that thermomechanical stresses between the first material and the second material are levelled out. It is additionally especially advantageous when the material of the blade tip has increasingly oxidation-resistant properties in the direction of the squealer tip, i.e. of the end of the blade tip in the radial direction. Particularly in the region of the squealer tip, a high oxidation resistance is advantageous because particularly aggressive conditions attack the material of the blade tip there.

The second material of the turbine blade of the invention advantageously includes ceramic particles. The ceramic particles advantageously increase the abrasion resistance of the second material. The concentration of the ceramic particles in the second material may be homogeneous over the volume of the blade tip, or alternatively be higher toward the squealer tip. Particular advantageous is given to using cubic boron nitride (cBN) or silicon carbide (SiC) or a combination of these substances as ceramic additive, without limitation thereto.

Advantageously, complex structures for cooling are disposed in the region of the blade tip of the turbine blade of the invention. In other words, complex cooling structures, e.g. cooling channels, are incorporated particularly in the squealer tip in order advantageously to further increase the oxidation resistance of the blade tip. This enables the provision of the complex structures particularly via the abovementioned additive manufacturing methods.

The turbine blade of the invention is advantageously a rotor blade of a gas turbine. The gas turbine is advantageously used in a gas and steam power plant.

A second aspect of the invention relates to a method of producing a turbine blade of the invention, comprising the steps of: —providing a main body, comprising a first material, of a turbine blade section on a build platform of a device for executing an additive method, —applying a pulverulent second material other than the first material in a particular amount, —melting the pulverulent material by the action of a high-energy beam, —lowering the build platform, wherein the steps of applying and melting the pulverulent material and of lowering the build platform are repeated in a number as required to complete the tip of the blade section.

The method of the invention can be used to apply the second material directly to the first material. The method includes additive manufacturing methods, for example laser application welding, selective laser melting and selective electron beam melting.

The method can advantageously be used to create complex structures in the region of the blade tip, particularly in the squealer tip, which contribute to cooling of the blade tip. Complex structures are, for example, channels and holes suitable for fluid media to flow through. It is therefore advantageous when, in the production of the blade tip, complex cooling structures are generated in the blade tip. Particular advantage is given to creating the complex cooling structures in the squealer tip.

In an embodiment of the method of the invention, the composition of the pulverulent second material is altered gradually in the course of application. This purpose is served particularly by the method of laser application welding, in which the material to be applied is applied to the surface of the material beneath with simultaneous melting. Laser application welding is advantageous here because it enables variation of the powder composition in situ during the welding operation. For that reason, it is additionally advantageous when the high-energy beam used is a laser beam.

Advantageously, ceramic particles are mixed into the pulverulent second material. The concentration of the ceramic particles in the second material may be uniform over the volume of the blade tip, or alternatively be higher toward the squealer tip, in that a greater amount of ceramic particles is mixed into the pulverulent second material in the direction of the squealer tip than in the region of the transition between the first and second materials. More advantageously, cubic boron nitride (cBN) or silicon carbide (SiC) or a combination of these substances is used as ceramic additive, without limitation thereto.

DETAILED DESCRIPTION OF INVENTION

Figure 1:
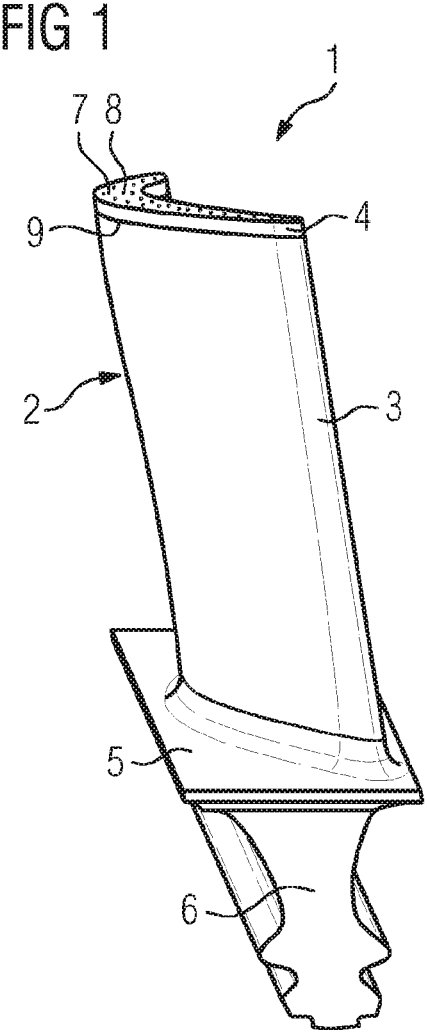
Figure 1one embodiment of a turbine blade of the invention.

FIG. 1 shows a rotor blade 1 for a gas turbine in one embodiment of the present invention. The rotor blade 1 comprises, according to the diagram, a blade section 2 that extends in radial direction and has a main blade body 3 and a blade tip 4. In addition, the rotor blade 1 comprises a blade platform 5 and a blade root 6 in fir tree-shaped form.

At the end that forms the conclusion of the blade section 2 in radial direction and hence the blade tip 4, the blade tip 4 has a squealer tip 7. The squealer tip 7 extends along the circumferential wall and is flush therewith on the outside.

The main blade body 3 comprises a first material. The first material of the main blade body in the working example is the alloy A247. Alternatively, the first material may also comprise or consist of other alloys.

The blade tip 4 and hence also the squealer tip 7 comprises a second material which is an alloy of the MCrAlY type. Specifically, the second material is an alloy having the following composition: Co: 22-26% by wt., Cr: 14-18% by wt., Al: 9.5-11.5% by wt., Y: 0.2-0.7% by wt., Re: 0.0-1.8% by wt., Ta: 0.0-1.7% by wt., the remainder being nickel and coincidental and unavoidable impurities. Alternatively, the second material may also comprise or consist of other alloys. The MCrAlY material comprises ceramic particles 8 of cubic boron nitride (cBN), silicon carbide (SiC) or a combination of these, or else alternatively of another material, as additives.

The material of the blade tip 4 is graduated at least in part-regions. The proportions of the alloy constituents of the above-described alloy are altered gradually here in such a way that there are minimal differences in relation to coefficients of thermal expansion and coefficients of thermal conductivity in the region of the transition 9 between the first material and second material. In the region of the squealer tip 7, for this purpose, the oxidation resistance of the material is higher than in the region of the transition 9. In other words, the oxidation resistance of the material of the blade tip 4 increases in radial direction. Alternatively, the material of the blade tip 4 may also be non-graduated.

The amount or concentration of the above-described ceramic particles 8 may also be graduated in the material of the blade tip 4. The concentration of the ceramic particles 8 here is higher in the region of the squealer tip 7 than in the transition region 9 between the first and second materials.

Figure 2:
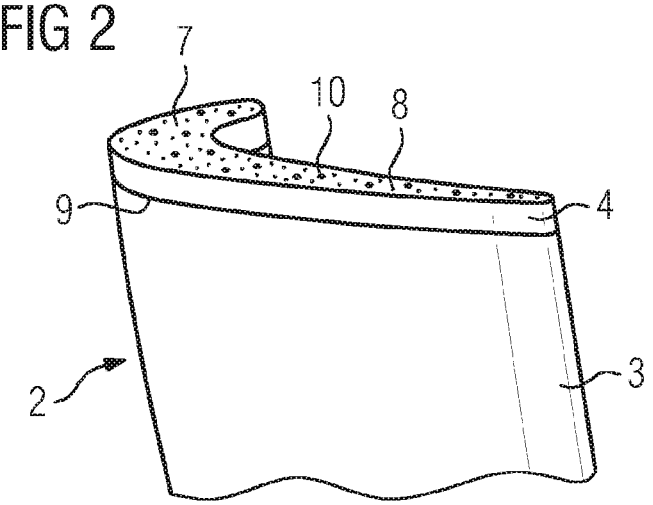
FIG. 2 an enlarged view of the blade tip of the turbine blade according to FIG. 1.

The region of the blade tip 4 with the squealer tip 7 is shown in detail in FIG. 2. Ceramic particles 8 are visible in the region of the squealer tip 7. The squealer tip 7 is in the form of a 3D body. Complex structures are formed in the squealer tip 7, particularly in the form of cooling channels, the inlet holes 10 of which are shown in the surface of the squealer tip 7. These cooling channels include complex structures which can be produced particularly by additive manufacturing methods, for example laser application welding or selective laser melting.

Figure 3:
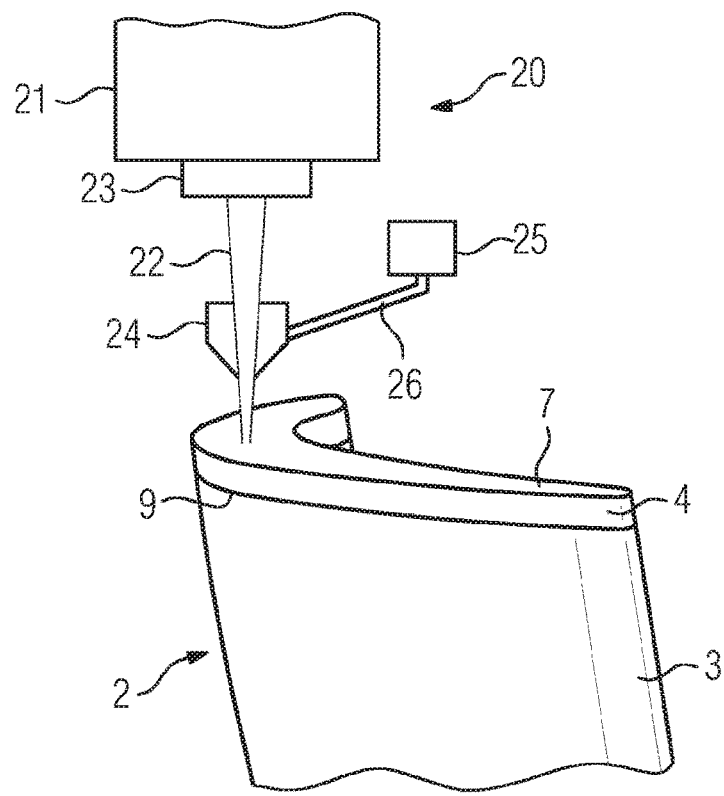
FIG. 3 a schematic diagram of an apparatus for execution of the method of the invention.

In a method of applying the second material to the first material by laser application welding, a device 20 shown in FIG. 3 is provided in a build chamber familiar to the person skilled in the art. The build chamber comprises a nitrogen or noble gas atmosphere in order to counteract trapped air in the material of the blade 2. The device 20 comprises a laser device 21 designed to generate a laser beam 22 or deflect it from an external laser source onto an object to be irradiated. For this purpose, the laser device 21 has components known to the person skilled in the art, for example glass fiber cables and reflecting mirrors.

A high-performance lens 23, for example an F-theta lens, is provided for focusing of the laser beam 22. The laser beam 22 is guided through a feed device 24 to the region of the blade tip 4. The feed device 24 is connected to a reservoir vessel 25 containing the second material from which the blade tip is to be produced in powder form. The powder is conveyed via a device for material conveying 26 to the feed device 24. The feed device 24 advantageously takes the form of a nozzle, in order to inject the pulverulent second material or jet it onto the surface of the material already present in the blade tip 4, such that it is made to melt directly by the laser when it hits a material layer.

The pulverulent second material is applied in FIG. 3 to a main body 3 of a blade section 2 of a rotor blade, in order to produce the tip of the blade section 4.

Figure 4:
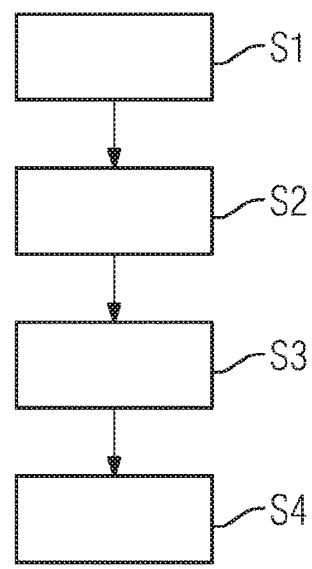
FIG. 4 a flow diagram of an embodiment of the method of the invention.

FIG. 4 shows one embodiment of the method of the invention for production of a blade 1 of the invention according to FIG. 1 as a flow diagram. In a first step S1, a turbine blade 1 to be manufactured with a main body 3, comprising a first material, of the turbine blade 2 is provided on a build platform of an apparatus for execution of an additive method. In a second step S2, a pulverulent second material other than the first material is conveyed in a particular amount out of the reservoir vessel 25 through the device for material conveying 26 to the feed device 24. The feed device 24 applies the pulverulent material to the first material of the main body 3 or to the second material of the blade tip 4 that has already been applied and solidified.

In a third step S3, the second material is melted by the action of the laser beam 22 and fused to the material beneath. Steps S2 and S3 can be performed simultaneously since the laser beam 22 is conducted through the feed device 24, and the pulverulent material already begins to melt at the moment of application. In a fourth step S4, the build platform is lowered. Steps S1-S4 are repeated in a number as required for completion of the tip of the blade section.

As an alternative to the laser application welding described, the blade tip can be produced by powder bed methods such as selective laser melting or selective electron beam melting. In this case, a corresponding build chamber would be provided, in which a powder layer can be applied to a material layer formed and particular regions in this material layer can be made to melt by means of a beam of energy and then solidified, and this process is repeated layer by layer until the component is complete.

Modifications and alterations to the invention that are obvious to a person skilled in the art are covered by the scope of protection of the patent claims.

The invention claimed is:

1. A turbine blade for a rotor of a gas turbine, comprising:
    a blade section which extends from a blade root in radial direction and includes a main blade body comprising a first material and a blade tip consisting of a second material, wherein the second material is more resistant to oxidation and the first material,
    wherein a composition of the second material is graduated at least in part-regions, and
    wherein the second material has the following chemical composition:
    Co: 22-26% by wt.,
    Cr: 14-18% by wt.,
    Al: 9.5-11.5% by wt.,
    Y: 0.2-0.7% by wt.,
    Re: 0.0-1.8% by wt.,
    Ta: 0.0-1.7% by wt., and
    a remainder being nickel and coincidental and unavoidable impurities,
    wherein the second material is graduated in a region of the transition from the first material to the second material, such that thermomechanical stresses between the first material and the second material are levelled out.

2. The turbine blade as claimed in claim 1, wherein the second material of the blade tip comprises an MCrAlY alloy.

3. The turbine blade as claimed in claim 1, wherein the first material used is an Alloy 247 alloy.

4. The turbine blade as claimed in claim 1, wherein the second material of the blade tip has increasingly oxidation-resistant properties in the direction of a squealer tip that constitutes the radial end of the blade tip.

5. The turbine blade as claimed in claim 1, wherein the second material includes ceramic particles.

6. The turbine blade as claimed in claim 1, wherein cooling channels are formed in the region of a squealer tip of the blade tip.

7. The turbine blade as claimed in claim 1, wherein the turbine blade is a rotor blade attached to the rotor of the gas turbine.

8. A method of producing the turbine blade as claimed in claim 1, the method comprising:
    providing the main body, comprising the first material, of a turbine blade section on a build platform of a device for executing an additive method,
    applying the pulverulent second material other than the first material in a particular amount, melting the pulverulent material by an action of a high-energy beam,
    lowering the build platform, wherein the steps of applying and melting the pulverulent material and of lowering the build platform are repeated in a number as required to complete the tip of the blade section.

9. The method as claimed in claim 8, wherein the composition of the pulverulent second material is altered gradually over a course of application.

10. The method as claimed in claim 8, wherein ceramic particles are mixed into the pulverulent second material.

11. The method as claimed in claim 8, wherein cooling channels are created in the region of a squealer tip of the blade tip.

12. The method as claimed in claim 8, wherein the high-energy beam used is a laser beam.

* * * * *